badge
2,801,997

CHROMABLE AZO-PHTHALOCYANINE DYES FOR CELLULOSIC FIBER AND WOOL

Hans B. Gottlieb, Glassboro, N. J., assignor to E. I. du Pont de Nemours and Company, Wilmington, Del., a corporation of Delaware No Drawing. Application December 29, 1955, Serial No. 556,089

2 Claims. (Cl. 260—146)

This invention relates to novel azo-phthalocyanine dyes adapted to dye cellulosic fibers and wool in green shades, of good fastness to washing and to light. More particularly, this invention deals with chromable azo-phthalocyanine dyes of the formula

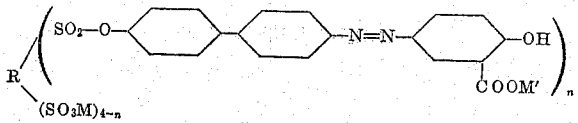

wherein R is the radical of copper-phthalocyanine or of a monohalogeno copper-phthalocyanine, for instance monochloro or monobromo, M and M' are cationic elements or radicals, for instance hydrogen, alkali-metal or ammonium, while $n$ is a numeral not less than 1 and not greater than 3. Inasmuch as mixtures of such compounds are included in the scope of this invention, $n$ may have fractional values between 1 and 3. Likewise, the average halogen content of the mixture per molecule may be a fractional value between 0 and 1.

I have found that products of the above general formula have the unusual property of being substantive both to wool and to cellulosic fibers such as cotton or regenerated cellulose fiber, and may be applied thereto from an aqueous dye bath. Moreover, because of the presence of an ortho hydroxy-carboxy pair, these dyes are chromable, and are thus readily converted into wash-fast and light-fast dyeings on the fiber.

Their shade is in the range of bluish green to yellowish green, which is a particularly advantageous property, inasmuch as there is a commercial want for bright, wash-fast and light-fast, direct dyes in this color range.

My novel dyes may be prepared by reacting 1 mole of copper-phthalocyanine tetrasulfonyl chloride, or a halogeno derivative thereof having one the average not more than one nuclear chlorine or bromine atom per molecule, with from 1 to 3 moles of 4-hydroxybiphenyl-4'-azosalicylic acid or a water-soluble salt thereof, and recovering the resulting sulfone ester.

Alkali-metal salts of the mentioned azosalicylic compound occur in commerce as a yellow dye under various trade names, for instance Diamond Flavine G (Colour Index No. 110), and these may be used in the above outlined synthesis of my novel coloring compositions.

Copper-phthalocyanine tetrasulfonyl chloride itself may be readily prepared according to U. S. Patent No. 2,219,330, for instance by heating a suspension of copper phthalocyanine in chlorosulfonic acid at temperatures of 130° to 135° C.

The reaction for synthesizing the dyes of this invention is readily effected by mixing the two colors in aqueous alkaline medium at a temperature of 0° to 25° C. The yellow dye is generally dissolved in the reaction mass, while the phthalocyanine tetrasulfonyl chloride, being sparingly soluble, is present in the form of a slurry. After agitation for a period of time, the reaction mass is acidified, and the color is filtered off and converted, if desired, into an alkali-metal or ammonium salt by treatment with a corresponding salt or base, for instance, sodium chloride, sodium carbonate, or ammonium hydroxide.

If desired, the color may be isolated from the reaction mass directly in the form of a salt thereof, for instance by omitting the acidification step prior to filtering.

By methods such as the above, my novel dyes may be isolated in the form of free acid (both on the COOH and SO₃H groups), acid salt (for instance SO₃Na, COOH form) or completely neutralized form (say, SO₃Na and COONa form).

Without limiting my invention, the following examples are given to illustrate my preferred mode of operation. Parts mentioned are by weight.

Example 1

(a) *Preparation of copper-phthalocyanine tetrasulfonyl chloride.*—One part of copper phthalocyanine (90% CPC) is dissolved in 3.6 parts of chlorosulfonic acid and agitated at 130° to 135° C. for 8 hours. After cooling to 60° C., the reaction mass is drowned into a slurry of 12 parts of cracked ice and 1.3 parts of sodium chloride. The sulfonyl chloride is filtered off and washed with 27 parts of cold (0° C.), 10%, sodium chloride solution.

(b) *Preparation of the chromable dye.*—The ice cold filter cake of copper-phthalocyanine tetrasulfonyl chloride from part (a) is slurried with 12 parts of cracked ice. A cold (10° C.) solution of 1.45 parts (2.77 moles per mole of CPC) of 4-hydroxybiphenyl-4'-azosalicylic acid (the free carboxylic acid of Colour Index No. 110) dissolved in 27 parts of water, containing 0.72 part of sodium hydroxide, is added to the slurry. After agitating the mixture at 0° C. for 7 hours it is allowed to warm up to room temperature (20° to 25° C.) and is agitated for an additional 8 hours. After adding 11 parts of sodium chloride, the slurry is acidified with 21 parts of cold (10° C.) 12% hydrochloric acid. The green dye is then filtered off, washed acid-free with 20% sodium chloride solution, and dried.

The product is believed to be the free acid form of the color represented by the above general formula, except that M and M' are both hydrogen, R is copper-phthalocyanine (chlorine-free) and $n$ is about 2.5. However, in view of the presence of salt in the reaction mass, it is possible that part of the color is present in the form of an acid salt, wherein M is probably sodium while M' is hydrogen.

(c) If procedure (b) is repeated except that the acidification with HCl is omitted, the product is obtained as a fully neutralized salt (i. e. M and M' are both Na).

By using potassium hydroxide instead of NaOH above, the corresponding potassium salt may be obtained in like fashion.

For preparation of the ammonium salt, the dye is preferably isolated in the form of free acid and is then slurried in aqueous ammonium hydroxide. Other salts, including the sodium and potassium salts, may likewise be prepared from the isolated free acid.

The dyes obtained in parts (b) and (c) above may be applied to cotton, viscose rayon, or wool from a neutral aqueous bath containing sodium chloride or sodium sulfate, as is customary in dyeing with direct dyes. Bright dyeings are thus produced, having good light-fastness and wash-fastness. The latter is particularly good if the dye is after-chromed on the fiber following the well-known procedures for after-chroming.

Example 2

If the procedure of Example 1 is repeated, except for using 1.2 parts of the azosalicylic acid compound (2.29 moles per mole of CPC) in lieu of the quantity indicated in part (b) of Example 1, a green dye of somewhat bluer shade is obtained.

Example 3

One part of copper mono-4-chlorophthalocyanine is reacted with 3.6 parts of chlorosulfonic acid according to the procedure described in Example 1(a) above, and the resulting sulfonyl chloride is reacted with a 2.77 molar ratio of the yellow azo dye (Colour Index No. 110) as described in Example 1(b).

The dye thus obtained resembles the product of Example 1(b) and gives bright green dyeings on cotton, viscose rayon and wool when dyed from a neutral bath in the presence of salt. These dyeings show exceptionally good fastness properties when after-chromed.

In lieu of the monochloro compound above, copper mono-4-bromophthalocyanine may be employed with essentially the same results.

It will be understood that the details of the above examples may be varied within the skill of those engaged in this art.

The products of this invention are dyes of well-defined shade and dyeing properties, but they do not necessarily consist of a single compound. In fact, chromatographic analysis points to the presence of at least two green components, with minor amounts of a blue (probably a sulfo-copper phthalocyanine) and a yellow component (residual azosalicylic color). The latter can be removed by extracting the product with acetone.

I claim as my invention:

1. Chromable azo-phthalocyanine dyes having the formula

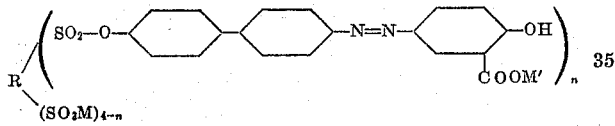

wherein R is the radical of a phthalocyanine compound selected from the group consisting of copper phthalocyanine, monochloro-copper phthalocyanine and monobromo-copper phthalocyanine, M and M' are cations of the group consisting of hydrogen, alkali-metal and ammonium, while $n$ has a value not less than 1 and not greater than 3.

2. The process of producing a chromable azo-phthalocyanine dye of green shade and having affinity for cotton and wool, which comprises reacting one mole of a phthalocyanine tetrasulfonyl chloride of the formula $$R\text{—}(SO_2Cl)_4$$

wherein R is the radical of a phthalocyanine compound selected from the group consisting of copper phthalocyanine, monochloro-copper phthalocyanine and monobromo-copper phthalocyanine, with from 1 to 3 moles of 4-hydroxybiphenyl-4'-azosalicylic acid, in aqueous alkaline medium and at a temperature between 0° and 25° C., and recovering the resulting green dye.

References Cited in the file of this patent

FOREIGN PATENTS 1,091,412     France     Oct. 27, 1954

OTHER REFERENCES

Venkataraman: Synthetic Dyes, 1952, page 524.